US011526650B1

(12) United States Patent
Ding et al.

(10) Patent No.: US 11,526,650 B1
(45) Date of Patent: Dec. 13, 2022

(54) SWITCHING POWER AWARE DRIVER RESIZING BY CONSIDERING NET ACTIVITY IN BUFFERING ALGORITHM

(71) Applicant: Cadence Design Systems, Inc., San Jose, CA (US)

(72) Inventors: Yi-Xiao Ding, Austin, TX (US); Zhuo Li, Austin, TX (US); Jhih-Rong Gao, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 41 days.

(21) Appl. No.: 17/219,761

(22) Filed: Mar. 31, 2021

(51) Int. Cl.
*G06F 30/398* (2020.01)
*G06F 30/392* (2020.01)
*G06F 30/394* (2020.01)
*G06F 30/3308* (2020.01)
*G06F 30/373* (2020.01)

(52) U.S. Cl.
CPC ........ *G06F 30/398* (2020.01); *G06F 30/3308* (2020.01); *G06F 30/392* (2020.01); *G06F 30/394* (2020.01); *G06F 30/373* (2020.01)

(58) Field of Classification Search
CPC .... G06F 30/398; G06F 30/392; G06F 30/394; G06F 30/3308; G06F 30/373
USPC ....... 716/120, 114, 109, 133; 703/14, 18, 19
See application file for complete search history.

(56) References Cited

U.S. PATENT DOCUMENTS

| 6,046,984 | A  | * | 4/2000 | Grodstein | G06F 30/3312 716/108 |
| 6,440,780 | B1 | * | 8/2002 | Kimura | G06F 30/327 438/129 |
| 6,698,006 | B1 | * | 2/2004 | Srinivasan | G06F 30/39 716/122 |
| 6,701,506 | B1 | * | 3/2004 | Srinivasan | G06F 30/327 716/122 |
| 6,701,507 | B1 | * | 3/2004 | Srinivasan | G06F 30/39 327/295 |
| 6,754,877 | B1 | * | 6/2004 | Srinivasan | G06F 30/39 716/134 |
| 6,938,176 | B1 | * | 8/2005 | Alben | G06F 1/3237 713/323 |
| 7,694,242 | B1 | * | 4/2010 | Li | H03K 3/012 716/100 |

(Continued)

*Primary Examiner* — Phallaka Kik
(74) *Attorney, Agent, or Firm* — Schwegman Lundberg & Woessner, P.A.

(57) ABSTRACT

A system includes one or more processors and a computer storage medium storing instructions that cause a machine to perform operations including accessing an integrated circuit (IC) design including an initial clock tree. The operations include selecting a first driver to evaluate for resizing, the first driver being a first size and having a first leakage current and determining a baseline power consumption measurement of clock tree based on the first size and the first leakage current of the first driver. The operations include identifying a plurality of replacement drivers to replace the first driver and determining a power consumption measurement for a second driver. Based on determining that the power consumption measurement for the second driver is less than the baseline power consumption measurement replacing the first driver with the second driver and generating a layout instance based on the second driver.

20 Claims, 10 Drawing Sheets

(56) References Cited

U.S. PATENT DOCUMENTS

| | | | | |
|---|---|---|---|---|
| 8,635,579 B1* | 1/2014 | Cao | G06F 30/30 | 716/108 |
| 9,606,573 B1* | 3/2017 | Ebeling | G06F 1/10 | |
| 2003/0107415 A1* | 6/2003 | Nguyen | H03K 23/00 | 327/115 |
| 2006/0107239 A1* | 5/2006 | Zhang | G06F 30/327 | 716/108 |
| 2007/0040596 A1* | 2/2007 | Nieh | G06F 1/10 | 327/295 |
| 2007/0162648 A1* | 7/2007 | Tousek | G06F 13/1642 | 710/22 |
| 2009/0267649 A1* | 10/2009 | Saint-Laurent | G06F 1/04 | 326/95 |
| 2011/0260764 A1* | 10/2011 | Kitahara | G06F 30/327 | 327/202 |
| 2011/0264849 A1* | 10/2011 | Ware | G06F 13/1689 | 711/E12.001 |
| 2012/0060136 A1* | 3/2012 | Suzuki | H03K 5/135 | 716/114 |
| 2012/0187988 A1* | 7/2012 | Aryanfar | G06F 1/10 | 327/156 |
| 2013/0219352 A1* | 8/2013 | Ishikawa | G06F 30/30 | 716/108 |
| 2014/0173538 A1* | 6/2014 | Adavani | G06F 30/34 | 716/104 |
| 2014/0225645 A1* | 8/2014 | Sharma | H03K 19/017581 | 326/98 |
| 2014/0289685 A1* | 9/2014 | Ma | G06F 30/327 | 716/102 |
| 2016/0011258 A1* | 1/2016 | Liao | G01R 31/318541 | 714/727 |
| 2016/0285437 A1* | 9/2016 | Thazhatheppattu | G06F 1/10 | |
| 2017/0357286 A1* | 12/2017 | Liu | G06F 30/327 | |
| 2018/0013432 A1* | 1/2018 | Klass | G06F 1/3296 | |
| 2018/0107264 A1* | 4/2018 | Liu | G06F 30/394 | |
| 2021/0080993 A1* | 3/2021 | David | H03K 17/6871 | |
| 2022/0300688 A1* | 9/2022 | Moceyunas | G06F 30/327 | |

* cited by examiner

US 11,526,650 B1

SWITCHING POWER AWARE DRIVER RESIZING BY CONSIDERING NET ACTIVITY IN BUFFERING ALGORITHM

TECHNICAL FIELD

The present disclosure generally relates to the technical field of integrated circuit design. In particular, the present disclosure addresses techniques for switching power-aware resizing of net drivers.

BACKGROUND

An integrated circuit (IC) layout specifies portions of various components of an IC. An IC design can include one or more clock trees as well as one or more data path trees. A clock tree distributes a clock signal from its root (e.g., a clock source) to sinks (e.g., flip flops) within an IC through a branching network of drivers (e.g., buffers or inverters). Similarly, a data path tree distributes a data signal from its root (e.g., flip-flops or combination logic) to sinks (e.g., flip flops) within an IC through a branching network of drivers (e.g., buffers or inverters). In either case, a driver distributes a signal to a grouping of other drivers and/or sinks, referred to as a "fanout" of a driver. Connectivity between a driver and its fanout is represented by a "net" and will be physically implemented by routed wires.

Electronic design automation (EDA) software systems commonly perform driver resizing to improve transition time, delay, power and other design constraints during data path optimization processes performed on an IC design. Driving resizing involves switching a driver cell to another driver cell with identical functionality, but different physical characteristics.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Various ones of the appended drawings merely illustrate example embodiments of the present inventive subject matter and cannot be considered as limiting its scope.

DETAILED DESCRIPTION

Figure 1:
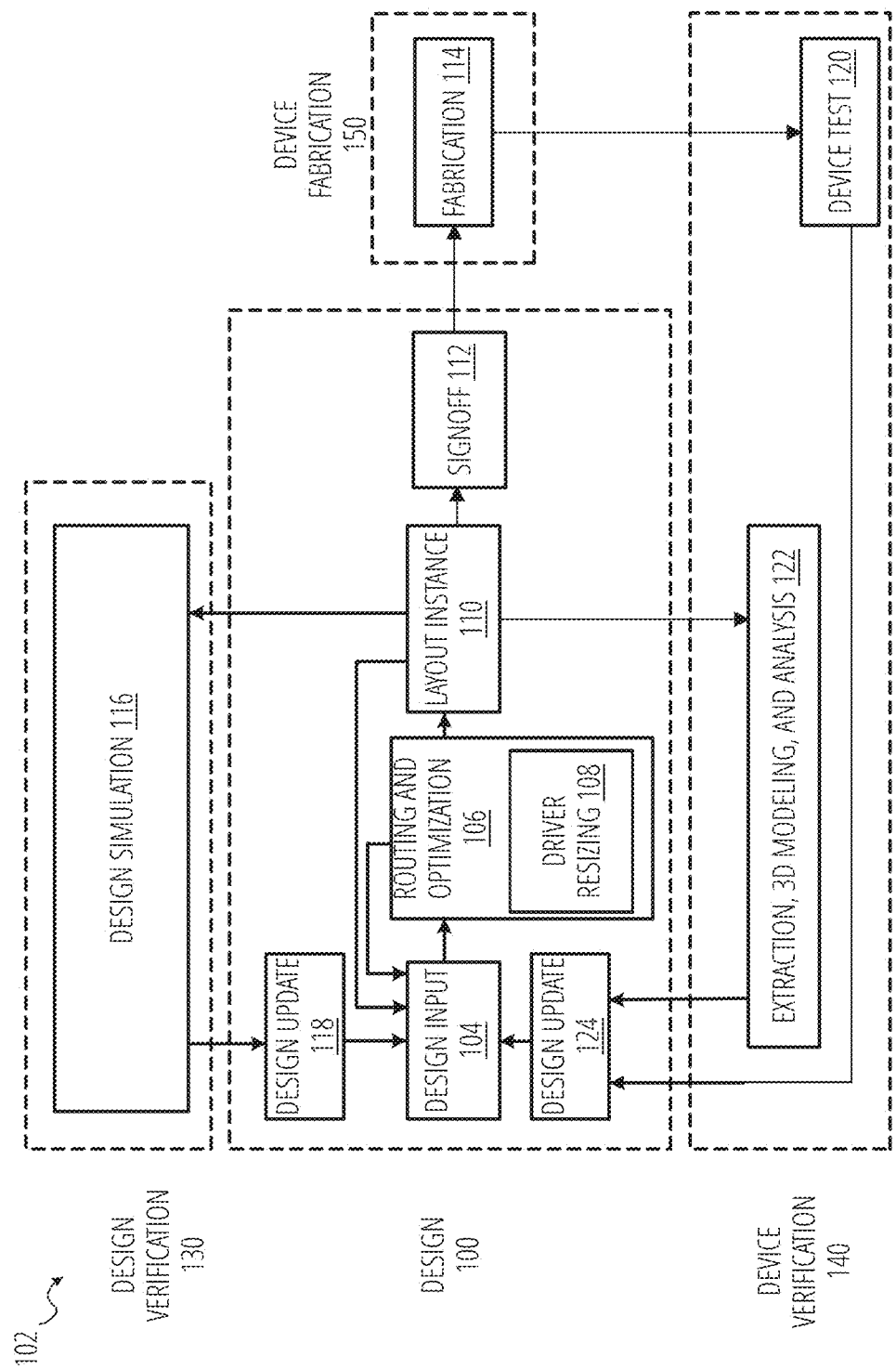
FIG. 1 is a diagram illustrating an example design process flow that includes power-aware resizing of clock-tree instances during clock tree synthesis and/or data paths, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Integrated circuits are used for a wide variety of electronic applications, from simple devices to complex computer systems. An integrated circuit chip (IC) can be thought of as a collection of logic cells with electrical interconnections between the cells, formed on a semiconductor substrate. An IC may include a very large number of cells and require complicated connections between the cells. A cell is a group of one or more circuit elements such as transistors, resistors, capacitors, inductors, and other basic circuit elements grouped together to perform a logic function.

An IC chip is fabricated by first conceiving the logical circuit description, and then converting the logical circuit description into a physical description, or geometric layout. This process is usually carried out using a "netlist" which is a record of all of the nets, or interconnections, between the cell pins. A layout typically consists of a set of planar geometric shapes in several layers. The layout is then checked to ensure it meets all of the design requirements, particularly timing requirements. The result is a set of design files known as an intermediate form that describes the layout. The design files are then converted into pattern generator files that are used to produce patterns called masks by an optical or electron beam generator.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

In addition to circuit partitioning, floor planning, placement and routing, a typical EDA IC design process may include one or more optimization operations during which design objectives such as slew, timing, power, and other considerations are improved. Optimization often involves buffering and rebuffering. With rebuffering, buffers and inverters may be replaced with other buffers of various sizes or locations to optimize design objectives. As an example, an existing buffer set may be partially removed, and a new buffer set may be inserted into a design during an optimization operation. Generally, rebuffering optimizations often include evaluating multiple rebuffering solutions (e.g., multiple buffer trees) using a scoring algorithm such as a return on investment (ROI) algorithm that indicates a measure of improvement provided by each rebuffering solution. Conventional scoring algorithm calculate a cost associated with each rebuffering solution based on slew, timing, power, or a combination thereof) and uses these costs as a basis for evaluating the improvement provided by each rebuffering solution. Traditional rebuffering optimizations produce numerous rebuffering solutions that require substantial processing resources to evaluate, which can hinder the run-time of such processing.

Conventional methods include resizing drivers by comparing area and leakage of various replacement drivers. However, the conventional methods fail to recognize the driver resizing impact on upstream nets' switching power. If a driver is upsized from A to B, in some cases, input pin capacitance increases which correspondingly increases switching power. A buffering solution including an upsized driver and/or buffer may see detrimental consequences by failing to account for increases in switching power. Therefore, there is a need for methods and systems to implement a driver resizing method by accounting for switching power.

Contrary to traditional approaches, a switching power-aware resizing approach allows for upsizing of clock buffers, inverters, gates, logic blocks, and combination instances if it results in an overall power savings, which is not possible with traditional approaches. Aspects of the present disclosure address problems with slow run-time of conventional approaches to rebuffering in electronic design automation (EDA), among others, with a design process that includes resizing drivers by considering the net activity of a buffer tree.

Traditional methods may upsize clock-tree instances to fix timing or DRV issues. This upsizing will typically result in an increase in switching power. Consistent with the methods and systems described herein, clock-tree instances not only address timing and/or DRV issues but also anticipate design issues that may arise if a selected solution would increase switching power. In such a scenario, the solution selected using traditional methods may be discarded as causing more issues than it resolves.

Consistent with some embodiments, a method may include accessing a circuit design that comprises a clock tree comprising routes that interconnect a plurality of clock-tree instances. A first driver from the plurality of clock-tree instances is selected to evaluate for resizing. Initially, the clock-tree instance is of a first size. The method further includes determining a baseline power consumption measurement corresponding to the clock-tree instance based on the first size and the first leakage current of the first driver. In some embodiments, the baseline power consumption measurement is based on a combination of internal power consumption, switching power dissipation, and leakage power dissipation of the clock-tree instance sub-tree. The method further includes identifying a plurality of replacement drivers to replace the first driver and further determining a power consumption measurement for a second driver in the plurality of replacement drivers. Based on determining the power consumption measurement for the second driver is less than the baseline power consumption measurement, the first driver is replaced with the second driver having a second size. In other words, the driver is changed from the first size to the second size based on the second size resulting in a power consumption measurement that is lower than the baseline power consumption measurement determined based on the initial size of the driver.

As described herein, methods and systems provide a technical solution considering an input activity level when selecting one or more drivers for resizing. By considering the impact on upstream net switching power, an appropriately resized driver can be selected and implemented in the design.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

FIG. 1 is a diagram illustrating an example design process flow 102 that includes clock tree wirelength reduction based on target offsets in connected routes, according to some embodiments. As shown, the design process flow 102 includes a design phase 100, a device fabrication phase 150, a design verification phase 130, and a device verification phase 140. The design phase 100 involves an initial design input 104 operation where the basic elements and functionality of a device are determined, as well as revisions based on various analyses and optimization of a circuit design. This design input 104 operation is where block instances are used in the circuit design, and any additional circuitry for the design around the blocks is selected. The initial strategy, tactics, and context for the device to be created are also generated in the design input 104 operation, depending on the particular design algorithm to be used.

In some embodiments, following an initial selection of design values in the design input 104 operation, routing, timing analysis, and optimization are performed in a routing and optimization 106 operation, along with any other automated design processes. While the design process flow 102 shows the routing and optimization 106 operation occurring prior to a layout instance 110, routing, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 112, as described below.

As shown, the optimization 106 operation includes a driver resizing 108 operation performed by the EDA system. The driver resizing 108 operation includes generating and evaluating multiple candidate driver solutions for a net to replace an initial buffer tree generated for the net. A net of the IC design describes interconnections between a driver (also referred to herein as a "net driver") and sinks and/or drivers that are driven by the driver. Each driver delivers a signal (e.g., a clock signal or other data signal) to a set of sinks and/or a set of drivers.

A cost for each driver solution that is generated is determined and evaluated in view of the switching power requirements. The EDA system is configured to evaluate the cost of the driver resizing in terms of area, leakage current (also referred to herein simply as "leakage") and switching power to determine an ideal candidate solution for resizing the existing or original driver in the buffer tree.

After design inputs are used in the design input 104 operation to generate a circuit layout, and any of the routing and optimization 106 operations are performed, a layout is generated in the layout instance 110. The layout describes the physical layout dimensions of the device that match the design inputs. Prior to this layout being provided to a fabrication 114 operation, the signoff 112 is performed on the circuit design defined by the layout.

After signoff verification by the signoff 112, a verified version of the layout is used in the fabrication 114 operation to generate a device, or additional testing and design updates may be performed using designer inputs or automated updates based on design simulation 116 operations or extraction, 3D modeling, and analysis 122 operations. Once the device is generated, the device can be tested as part of device test 120 operations, and layout modifications generated based on actual device performance.

A design update 124 from the design simulation 116 operations; a design update 124 from the device test 120 operations or the extraction, 3D modeling, and analysis 122 operations; or the design input 104 operation may occur after the initial layout instance 110 is generated. In various embodiments, whenever design inputs are used to update or change an aspect of a circuit design, a timing analysis and the routing and optimization 106 operation may be performed.

FIGS. 2A-2D are conceptual diagrams that graphically illustrate a method for power-aware resizing of clock-tree instances, according to some embodiments. It will be understood that the method illustrated in FIGS. 2A-2D may be performed by a device, such as a computing device executing instructions of an EDA software system. Accordingly, FIGS. 2A-2D are described below with reference to such a computing device. Further, although the FIGS are described with reference to clock trees, driver resizing is also applied to data path optimization. In a data path tree, roots and sinks can be flip flops or any combinational logic.

Figure 2A:
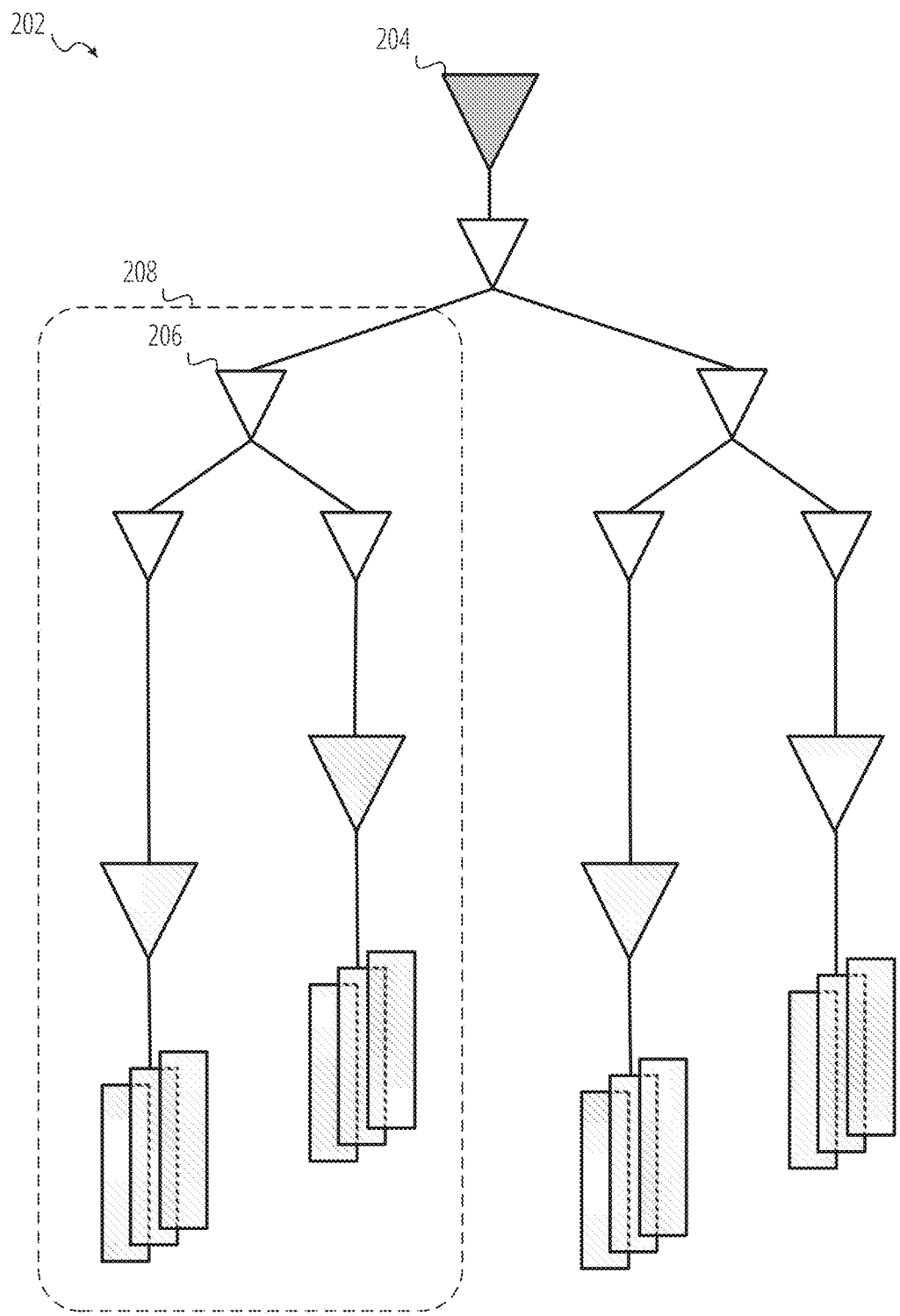
FIG. 2A-2D are conceptual diagrams that graphically illustrate a method for switching power-aware resizing of clock-tree instances and/or data path instances, according to some embodiments.

With reference to FIG. 2A, a clock tree 202 is shown. The clock tree 202 comprises multiple interconnected nodes, each of which comprises a clock-tree instance (e.g., a clock inverter, buffer, or gate). More specifically, the clock tree 202 includes a plurality of clock drivers (e.g., buffers and inverters) that deliver a clock signal from a clock-tree root node 204, which comprises a clock source of a circuit design, to a plurality of clock-tree leaf nodes, which comprises a plurality of clock-tree sinks within the circuit design. Each clock-tree instance in the clock tree 202 is evaluated (e.g., by the computing device executing instructions of the EDA software system) for resizing based on whether the resizing results in an overall reduction to power consumption. The clock-tree instances are evaluated in a top-down search of the clock tree 202 beginning with the root node 204 or a user-specified node.

In the particular example illustrated in FIG. 2A, a clock-tree instance 206, which corresponds to a clock driver, is evaluated by the computing device for resizing. Initially, the clock-tree instance 206 is included in the clock tree 202 at a first size. In evaluating the clock-tree instance 206, the computing device determines a baseline power consumption measurement for a sub-tree 206 of the clock-tree instance 204 based on the initial size of the clock-tree instance 204. The sub-tree 208 of the clock-tree instance 206 comprises a sub-set of nodes of the clock tree 202. In particular, the sub-tree 208 includes the clock-tree instance 206 and nodes connected downstream—either directly or indirectly—to the clock-tree instance 206. The computing device determines the baseline power measurement based on internal, switching, and leakage power dissipation of the sub-tree 208 with the clock-tree instance 206 at the first size.

Although the clock-tree instance 206 is initially included in the clock tree 202 at the first size, the clock-tree instance 206 may be available in multiple alternative sizes. The computing device determines an alternative power consumption measurement for each available alternative size based on corresponding internal, switching, and leakage power dissipation of the sub-tree 206.

For example, the computing device determines a first power consumption measurement for the sub-tree 208 based on a second size of the clock-tree instance 206 and a second power consumption measurement for the sub-tree 208 based on a third size of the clock-tree instance 206. The lowest power consumption measurement (e.g., the lesser of the first and second power consumption measurements) is compared with the baseline power consumption measurement, and if the lowest power consumption measurement is less than the baseline power consumption measurement, the clock tree instance 206 is resized according to the size that corresponds to the lowest power consumption measurement.

Figure 2B:
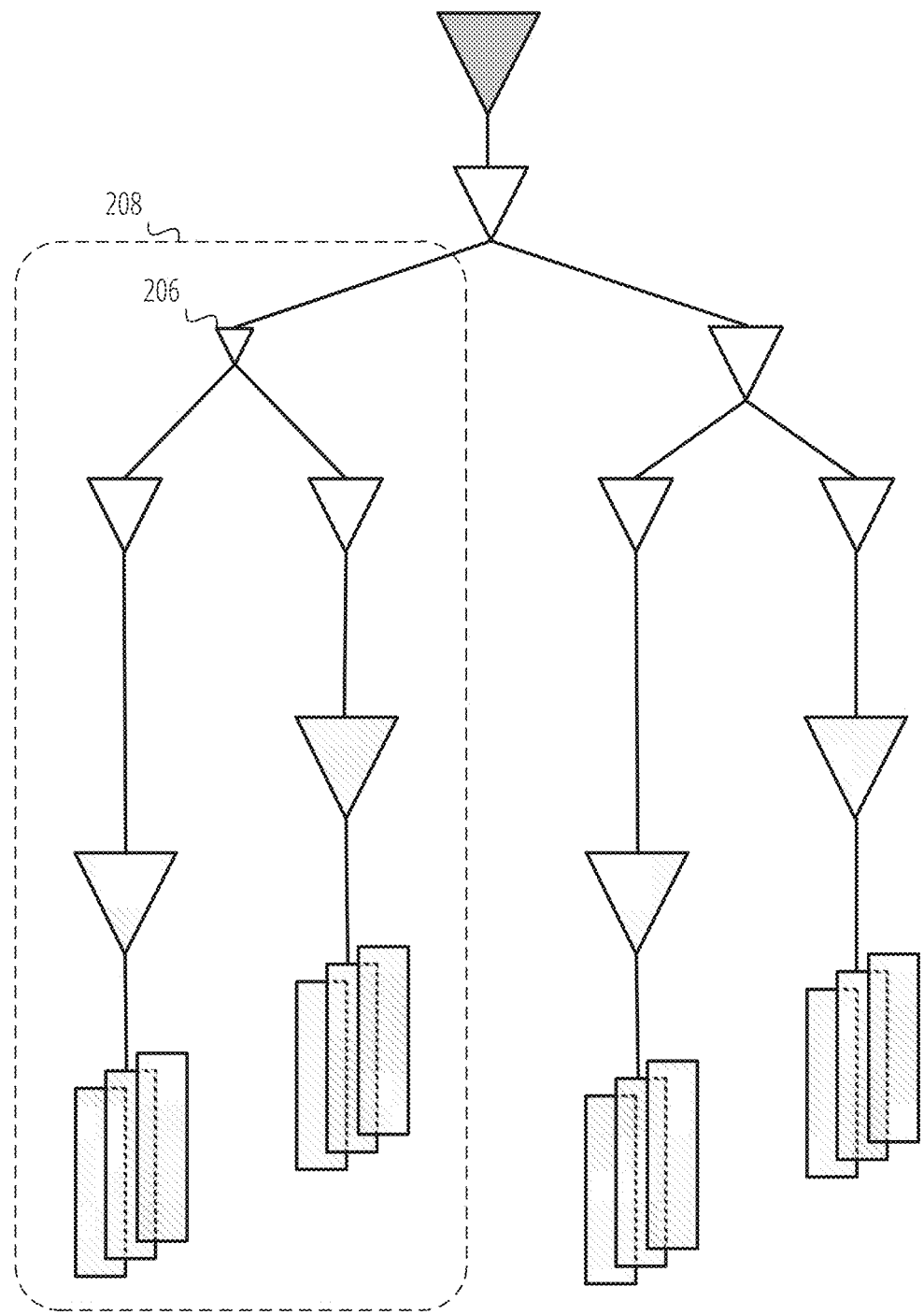

As an example, in FIG. 2B, the clock-tree instance 206 is resized according to a second size, which leads to a reduction in the power consumption of the clock tree 202. That is, the clock-tree instance 206 is changed from the first size to the second size in response to determining that a ROI on the improvement over the total cost for resizing from the first size to the second size warrants the resizing. In some embodiments, to determine the ROI, the power consumption measurement associated with the second size (e.g., the lowest power consumption measurement) is calculated and determined that the power consumption measurement is less than a power consumption measurement associated with the first size (e.g., the baseline power consumption measurement). As shown in FIG. 2B, the resizing of the clock-tree instance 206 includes downsizing the clock-tree instance 204.

Figure 2C:
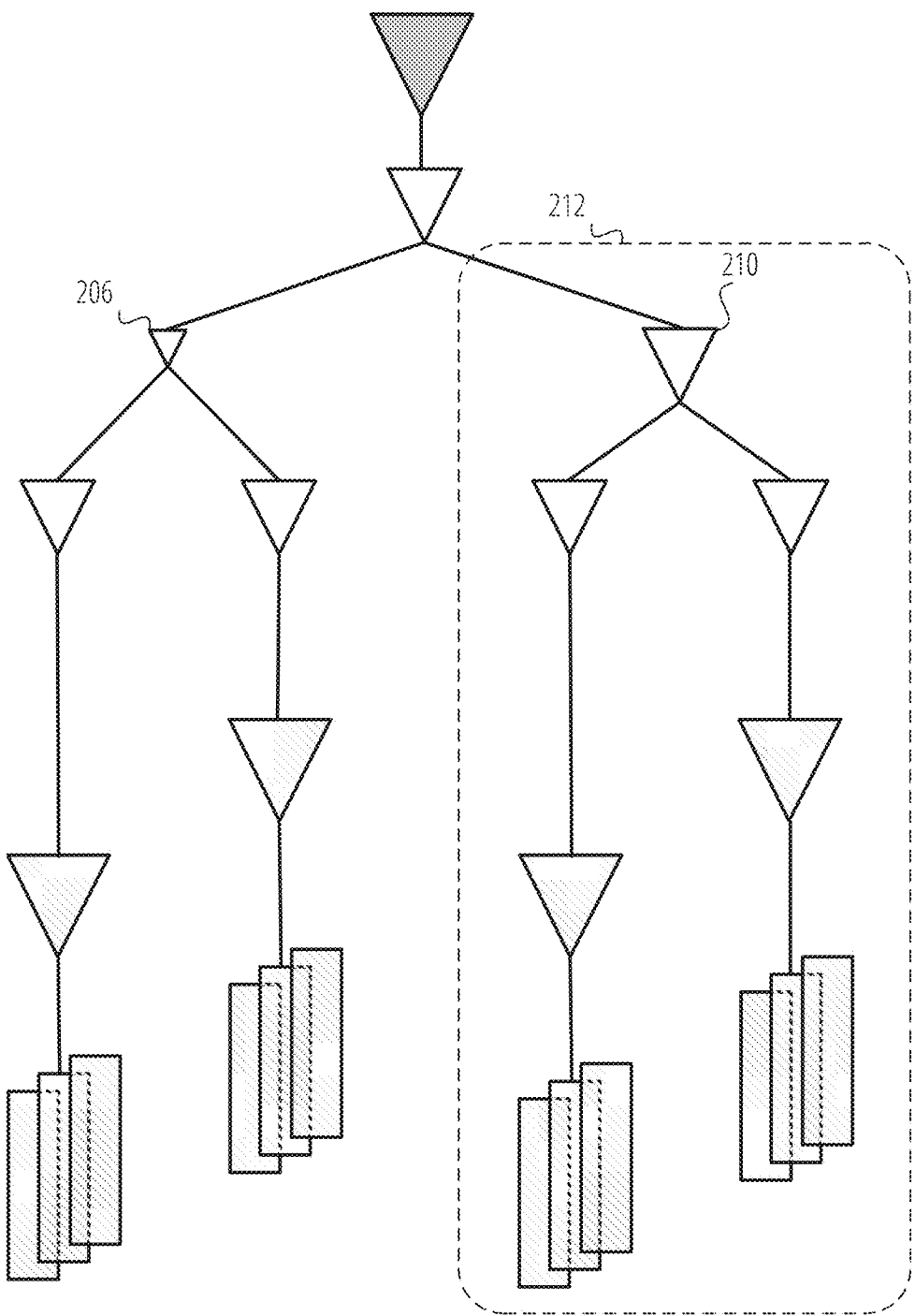

As another example, in FIG. 2C a clock-tree instance 210 is evaluated. Similar to the evaluation of clock-tree instance 206, in evaluating the clock-tree instance 210, the computing device determines a baseline power consumption measurement for a sub-tree 212 of the clock-tree instance 210 with the clock-tree instance 210 at an initial size. The computing device also determines power consumption measurements for the sub-tree 212 with the clock-tree instance 210 sized at each available replacement driver size. The lowest power consumption measurement is compared with the baseline power consumption measurement, and if the lowest power consumption measurement is less than the baseline power consumption measurement, the clock-tree instance 208 is resized according to the driver size that corresponds to the lowest power consumption measurement.

Figure 2D:
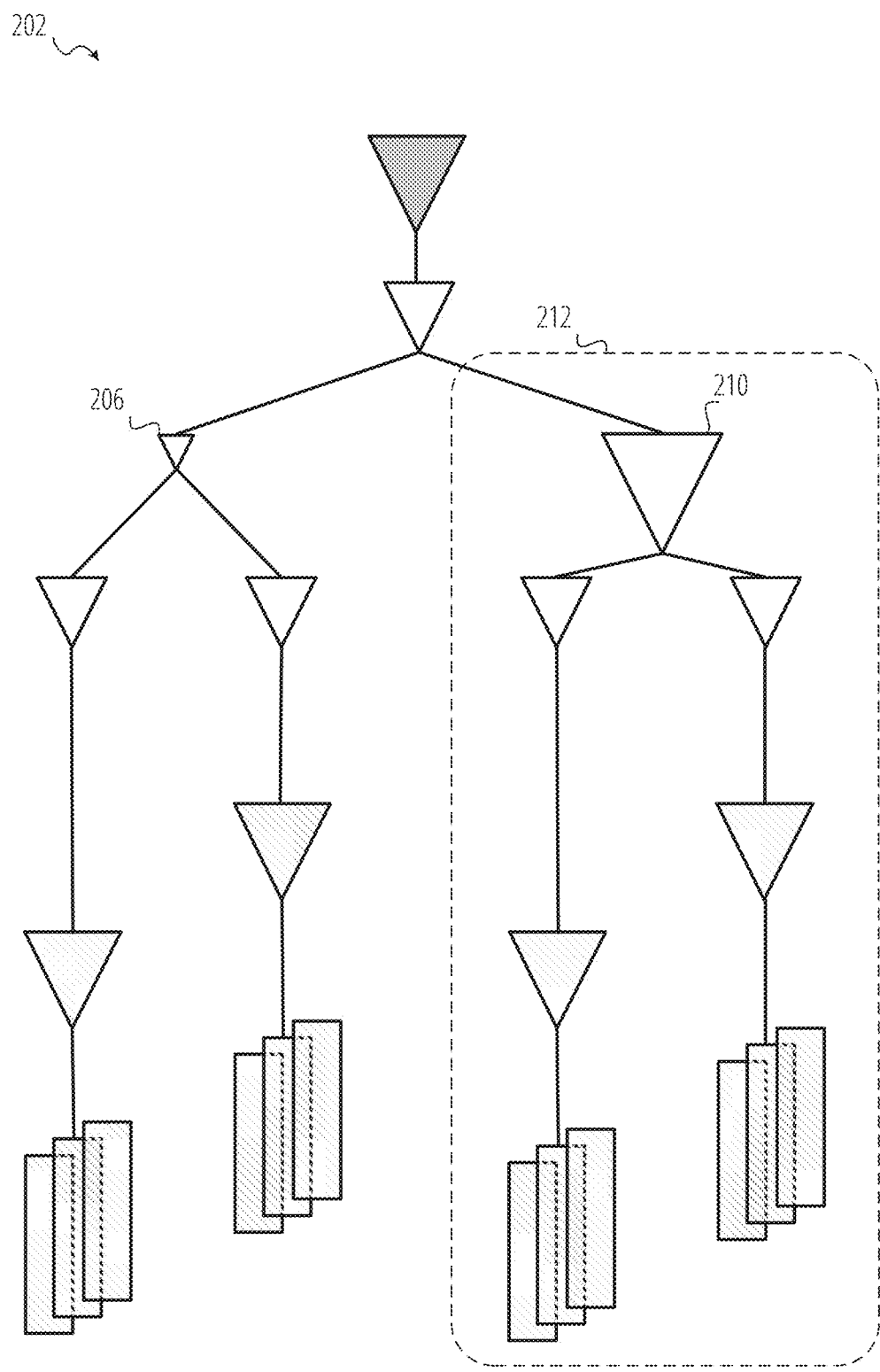

As an example, in FIG. 2D, the clock-tree instance 210 is resized according to a second size that lead to a reduction in the power consumption of the clock tree 202. That is, the clock-tree instance 206 is changed from the initial first size to the second size in response to determining that the ROI for resizing the clock-tree instance from the first size to the second size warrants the resizing. In some embodiments to determine the ROI, the power consumption measurement associated with the second size (e.g., the lowest alternative power consumption measurement) is calculated and determined that the power consumption measurement is less than a power consumption measurement associated with the first size (e.g., the baseline power consumption measurement). As shown in FIG. 2D, the resizing of the clock-tree instance 210 includes upsizing the clock-tree instance 210. Although not illustrated, the process described above in reference to clock-tree instances 206 and 210 may be repeated for each node in the clock tree 202. Additionally, the resizing of the clock-tree instance 210 may optionally include adding, modifying, or removing buffers/inverters where appropriate.

Figure 3:
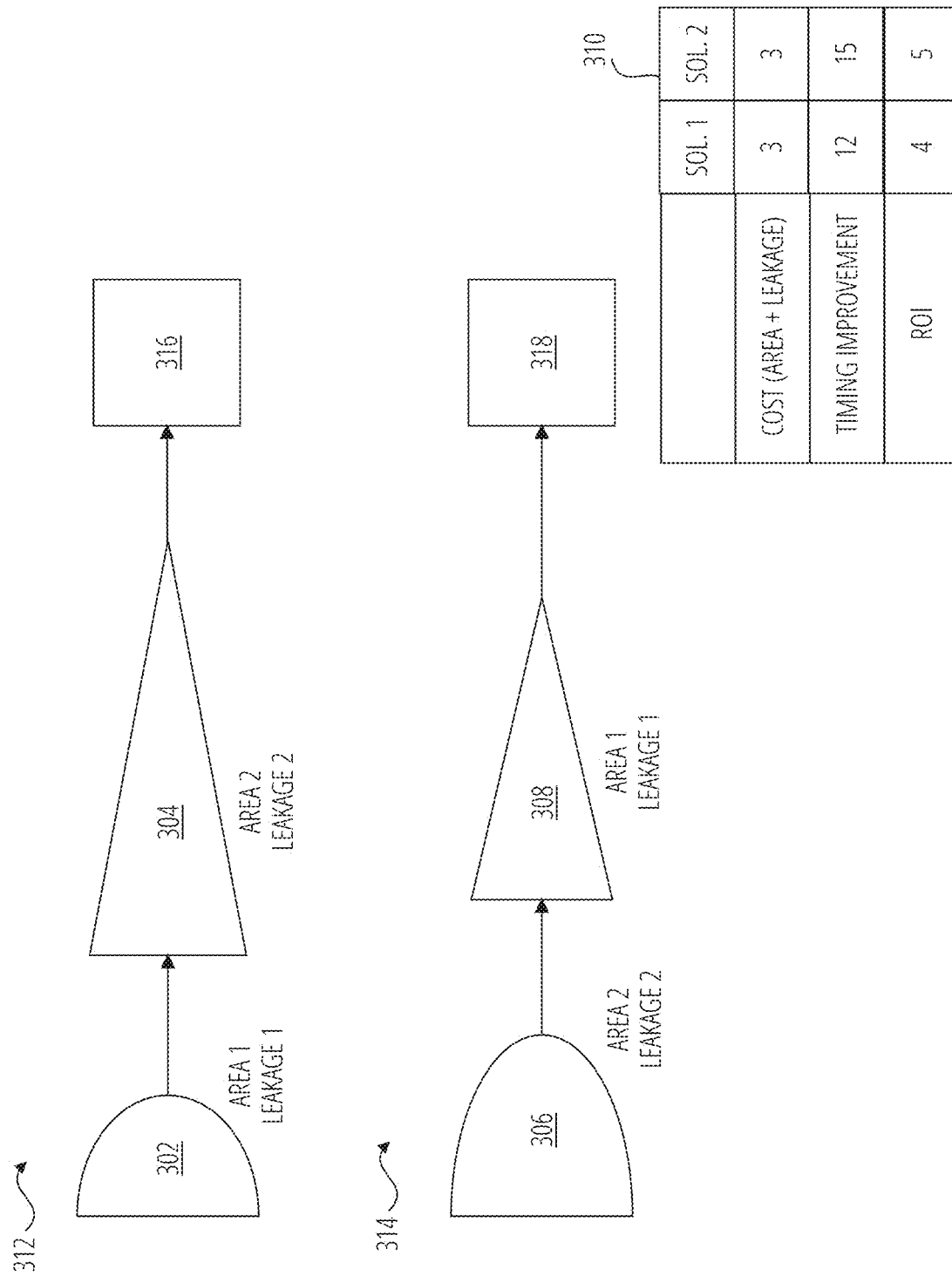
FIG. 3 is a diagram illustrating a method for selecting a driver for resizing clock tree instances, according to some embodiments.

FIG. 3 shows diagram representations of two solutions for replacing a driver in accordance with some embodiments. Example solution 312 is a first driver replacement solution including driver 302 and buffer 304 coupled to sink 316. Driver 302 has an area of 1 and a leakage of 1. Buffer 304 has an area of 2 and a leakage of 2 coupled to sink 318.

Solution 314 is a second driver replacement solution including driver 306 and buffer 310. Driver 306 has an area of 2 and a leakage of 2. Buffer 308 has an area of 1 and a leakage of 1. Both solutions 312 and 314 have equivalent total costs (area+leakage) although solution 314 has a better timing improvement as depicted in table 310. By comparing solution 312 and solution 314, it seems obvious to select solution 314. However, as described with respect to FIG. 4, it is seen that solution 312 is a better option.

Figure 4:
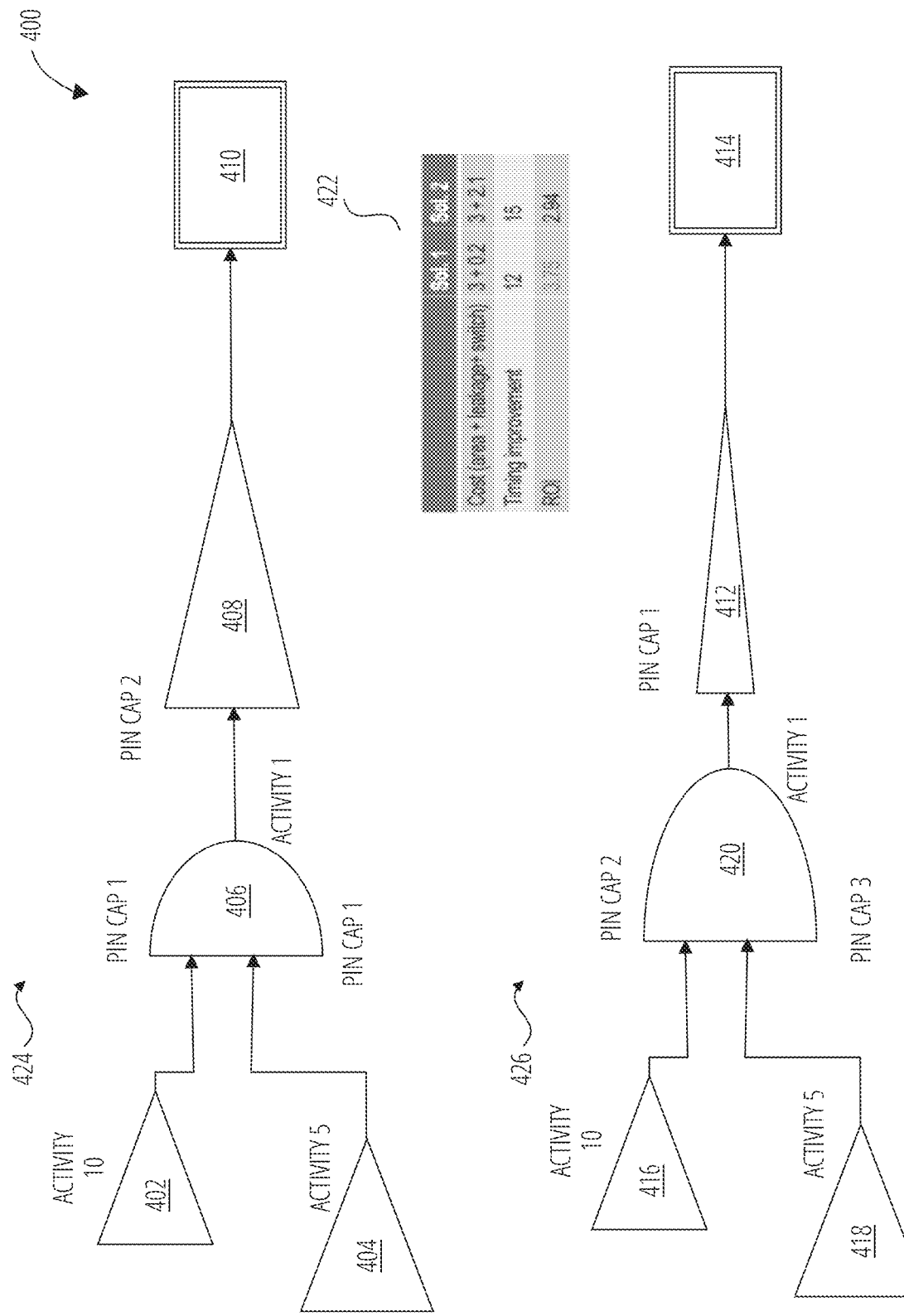
FIG. 4 is a conceptual diagram that illustrates a method for selecting a driver for resizing clock-tree instances, according to some embodiments.

FIG. 4 shows diagram representations of replacement drivers in accordance with some embodiments. FIG. 4 shows diagram 400 of a first replacement driver solution 424 (similar to solution 312 of FIG. 3) that includes clock-tree instance 402 and a clock-tree instance 404 and a second replacement driver solution 426 (similar to solution 314 of FIG. 3) that includes clock-tree instance 416 and a clock tree instance 418.

The first replacement driver solution 424 includes a driver 406 and a buffer 408 coupled to sink 410. The second replacement driver solution 426 includes a driver 420 and a buffer 412 coupled to sink 414. As an example, clock tree instance 402 has a calculated activity level of 10 and clock tree instance 404 has a calculated activity level of 5. The activity levels refer to a frequency of switching activity (e.g., on/off) seen at the instance. A higher activity level corresponds to a higher switching power. In other words, high activity levels correspond to high power consumption.

Driver 406 of the first replacement driver solution 424 has a pin capacitance of 1 at each input and an activity level of 1. Buffer 408 has a pin capacitance of 2, an area of 2 and a leakage of 2 (as seen in 304). Based on the activity levels, a switching power is calculated at each instance using the formula:

$$P_{switching} = \alpha C V_{DD}^2 f$$

As determined by the EDA of the computing device, implementing the first replacement driver scenario would provide a timing improvement of 12.

Further, to account for upstream activity seen at driver 406 via clock tree instance 402 and 404, a delta switching power is calculated. The delta switching power is calculated as the sum of the upstream net activity multiplied by the delta of the pin capacitance of the driver added to the buffer pin capacitance multiplied by the activity of the buffer.

Using the example values provided for the initial driver scenario, the computing device can, for example, calculate the delta between switching power for the first replacement driver solution 424 as follows:

delta switching power=(10*0)+(5*0)+(2*1)=2.

Thus, in this example, the difference, or delta, in switching power is 2.

A second replacement driver solution 426 includes clock tree instances 416 and 418. The inputs of the resized driver remain the same as seen in the first replacement driver solution 424. Thus, clock tree instances 416 and 418 have an activity level of 10 and 5, respectively. Driver 420 is larger than driver 406 and the pin capacitances of driver 420 are higher than that of driver 406. Correspondingly, buffer 412 is smaller than buffer 408 of FIG. 4.

In an example, the calculation of the delta switching power for the second replacement driver solution 426 is as follows:

delta switching power=(10*1)+(5*2)+(1*1)=21.

Driver 420 has pin capacitances of 2 and 3, making the difference between driver 420 and pin capacitances of driver 406 to be 1 and 2. Thus, for the second replacement driver, the difference, or delta, in switching power is 21.

To provide an accurate calculation of the impact of the delta switching power in buffer resizing, the delta switching power can, for example, be scaled using the scalar equation computed as:

Scaler=S/(C*A)

where S=switching power of the net, C=total capacitance of the net, and A=total activity of the net.

To determine the optimal solution, both the cost and the timing improvement of each replacement driver solution is reviewed. As an example, calculating a return-on-investment (ROI) as a comparison in terms of area, leakage current, and switching power with each option's timing improvements can be done as follows:

ROI=Timing improvement/cost where cost=area+leakage+(scalar*delta switching power)

In the example given in FIG. 4, the ROI for the first replacement driver solution 424 I is calculated to be 3.75 as shown in table 422, and the ROI for the second replacement driver solution 426 is calculated to be 2.94. Since the first replacement driver solution 424 has a higher ROI, the first replacement driver solution is selected to replace the current, or original driver.

Thus, as seen in comparison with the example provided in FIG. 3, the second driver replacement solution is not the best solution. By calculating the switching power, it can be understood that the first replacement driver offers a better return on investments and is the better replacement driver option.

Figure 5:
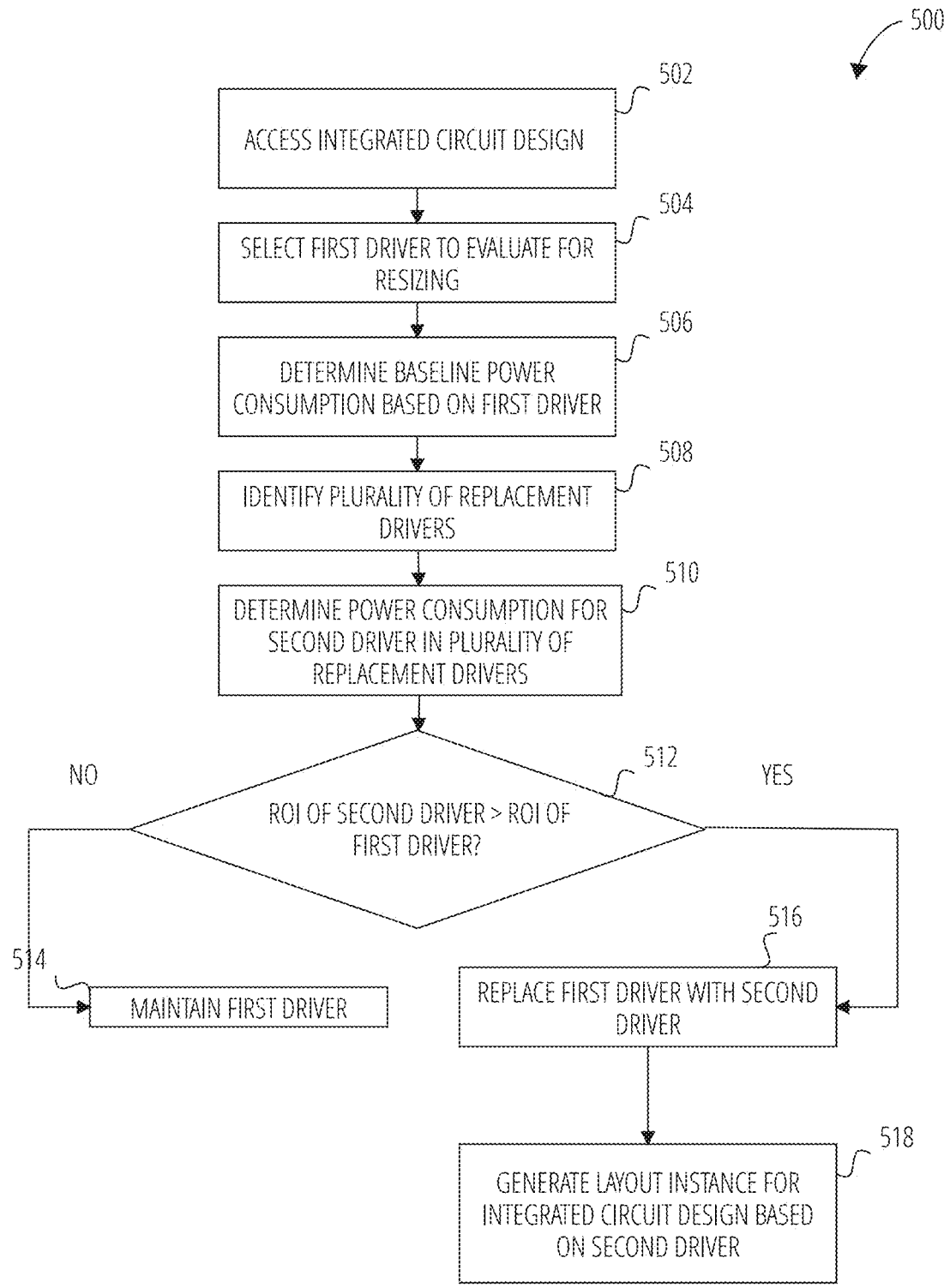
FIG. 5 is a flowchart illustrating operations of a method for switching power-aware resizing of clock-tree instances, according to some embodiments.
Figure 6:
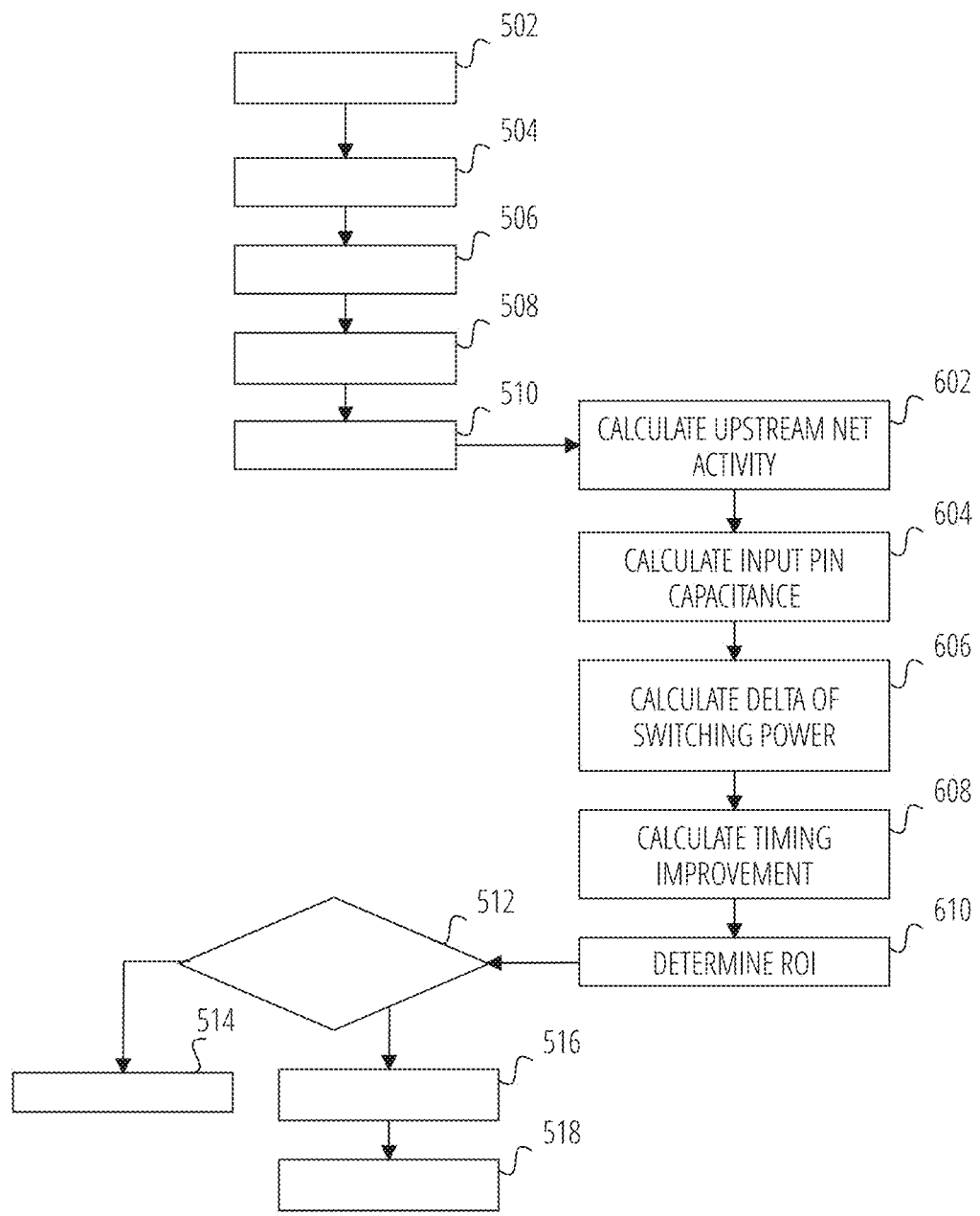
FIG. 6 is a flowchart illustrating operations of a method for determining a power consumption of a clock sub-tree, which may be performed as part of the method for switching power-aware resizing of clock tree instances, according to some embodiments.

FIGS. 5 and 6 are flowcharts illustrating operations of a method 500 for switching power-aware resizing of clock-tree instances, according to some example embodiments. For some embodiments, the method 500 is performed as part of a CTS process applied to a circuit design (e.g., by an EDA software system).

It will be understood that the method 500 may be performed by a device, such as a computing device executing instructions of an EDA software system. For instance, the operations of the method 500 may be represented by executable instructions (e.g., EDA software) that, when executed by a processor of a computing device, cause the computing device to perform the method 500. Thus, an operation of the method 500 may be performed by a hardware processor (e.g., central processing unit or graphics processing unit) of a computing device (e.g., desktop, server, etc.). Accordingly, the method 500 is described below with reference to such a computing device.

Depending on the embodiment, an operation of the method 500 may be repeated in different ways or involve intervening operations not shown. Though the operations of the method 500 may be depicted and described in a certain order, the order in which the operations are performed may vary among embodiments, including performing certain operations in parallel.

The method 500 as illustrated begins at operation 502 where the computing device accesses an integrated circuit design stored in memory. The integrated circuit design comprises multiple nets (e.g., clock nets and data path nets). Each net comprises one or more routes that connect a root node to one or more drivers, each of which is connected to one or more downstream cells in its fanout. Each net can correspond to a portion of an initial clock tree or data path tree.

The integrated circuit design comprises a clock tree comprising one or more routes that interconnect a plurality of clock tree instances. At least some portions of the clock-tree may be constructed using the Steiner-tree approach, as described above. As will be discussed below, the method 500 may be iteratively repeated for each clock-tree instance in the clock tree, in which case, the clock tree accessed at operation 502 may, in some instances, be a clock tree that is a modified version of a clock tree that was accessed in a previous iteration of the method 500 at operation 502.

At operation 504, the computing device selects a clock-tree instance (e.g., net driver) in the clock tree or a data path instance in a data path tree to evaluate for resizing. The selected instance may correspond to a clock inverter, buffer, or gate. Initially, the instance is included in the tree at an initial size (e.g., a first size), though the instance may be available in one or more alternative sizes. It is understood that the described methods and systems can be applied to either a clock tree, data path tree, or a combination of both. For ease of discussion, method 500 will be described with reference to a clock tree. However, method 500 can additionally and/or alternatively be applied to a data path tree.

In some embodiments, the clock-tree instance may be selected based on a position of the clock-tree instance in the clock tree. For example, as noted above, a top-down search of the clock tree may be performed to evaluate each clock-tree instance for resizing. Hence, the position of each clock-tree instance in the clock tree determines an order in which the clock-tree instances are evaluated as the clock tree is traversed. In this example, initially a clock-tree instance corresponding to a root node of the clock tree is selected at operation 504. In subsequent iterations, the computing device may select downstream clock-tree instances in the clock tree to evaluate for resizing in a top-down, left-to-right manner.

In some embodiments, the clock-tree instance may be selected based on user input. For example, the computing device may provide a user interface to a user that allows a user to select a clock-tree instance to evaluate for resizing.

At operation 506, the computing device determines a baseline power consumption measurement of the clock tree based on the selected or initial clock tree instance (e.g., original net driver). That is, the baseline power consumption measurement is a measurement of the total power consumed by the clock tree, or sub-tree based on the initial size of the clock-tree instance. The sub-tree of the clock-tree instance comprises the clock-tree instance and any clock-tree instances connected either directly or indirectly to the clock-tree instance. As will be discussed below, the computing device determines the baseline power consumption measurement based on a leakage, switching, and internal power consumption of the sub-tree with the clock-tree instance at the initial size.

The computing device at operation 508 identifies one or more replacement clock-tree instances to replace the first clock tree instance selected for resizing. Various solutions including combinations of drivers and buffers can be generated and/or identified as a replacement option. Further, at operation 510, a power consumption measurement for a second driver in the plurality of replacement drivers is determined. In some embodiments, a power consumption measurement is determined for each driver in the plurality of replacement drivers and a subset of the plurality of replacement drivers is selected for further analysis.

At operation 512, the computing device determines whether the ROI of the second driver is greater than the ROI of the first (initial) driver. In some embodiments, determining the ROI includes determining that the power consumption of the replacement driver is less than the baseline power consumption based on at least a size of the replacement driver. That is, the power consumption measurement is a measurement of total power consumed by the sub-tree based on the alternative size of the clock-tree instance. In some examples, the computing device determines the power consumption measurement based on a leakage power dissipation, switching power dissipation, and internal power consumption of the sub-tree with the replacement driver.

If, at operation 512, the computing device determines the ROI of the second driver is not greater than the ROI of the first driver (e.g., the alternative power consumption measurement is equal to or greater than the baseline power consumption measurement), the computing device maintains the initial driver at its initial size at operation 514.

On the other hand, if, at operation 512, the computing device determines the ROI of the second driver is greater than the ROI of the first driver, the computing device resizes the clock-tree instance according to the alternative size corresponding to the alternative power consumption measurement, at operation 516. That is, the computing device changes a size of the clock-tree instance from the initial size to the alternative size (e.g., from a first size to a second size). In resizing the clock-tree instance, the computing device may either downsize or upsize the clock-tree instance. Additionally, the computing device may add/remove/modify intervening buffers as needed in accordance with the identified replacement drivers.

In some embodiments, prior to resizing the clock-tree instance according to the replacement driver, the computing device may verify that the resizing of the clock-tree instance does not violate any design constraints such as skew, slew, and capacitance. If resizing the clock-tree instance would result in violation of any one of the design constraints, the computing device may maintain the clock-tree instance at its initial size or resize according to another alternative size that does not result in violation of a design constraint.

At operation 518, the computing device generates a layout instance for the integrated circuit design based on the resized clock-tree instance. The layout instance describes the physical layout dimensions of the integrated circuit design.

Depending on the embodiment, an operation of the method 500 may be repeated in different ways or involve intervening operations not shown. For example, the clock tree may be refined through one or more optimizations (e.g., wirelength reduction) after operation 516, but prior to generating the layout instance at operation 518. As another example, the method 500, or at least operations 504-512 of the method 500, may be repeated for each clock-tree instance in the clock tree. Thus, one or more additional clock-tree instances in the clock tree may be resized prior to generating the layout instance at operation 518. Further, though the operations of the method 500 may be depicted and described in a certain order, the order in which the operations are performed may vary among embodiments, including performing certain operations in parallel.

FIG. 6 is a flow diagram illustrating additional operations of method 500 in accordance with some embodiments. As shown in FIG. 6, the method 500 may, in some embodiments, further include operations 602-610. Consistent with these embodiments, the operations 502-510 may be performed prior to or as part of (e.g., pre-cursor tasks, a sub-routine or sub-operations) of operation 510, where the computing device determines the alternative power consumption measurement.

At operation 602, the computing device calculates an upstream net activity by determining a frequency at which the selected instance switches on/off. The higher the activity at the instance, the higher the switching power. In addition, the computing device calculates an input pin capacitance for each instance (e.g., buffer, inverter) within the driver replacement at operation 604. In some embodiments, the input pin capacitance is a known value received from a library of drivers/buffers including corresponding pin capacitance values. At operation 606, the computing device calculates a delta between the switching power of the initial clock tree instance (e.g., driver) and each of the replacement drivers. Additionally, a timing improvement is calculated at operation 608 for each of the replacement drivers in comparison to the initial driver. By comparing the delta and timing improvements calculated in operations 606 and 608, a return-on-investment (ROI) can be calculated at operation 610. As discussed with reference to FIGS. 3 and 4, it was seen that the second replacement driver (e.g., 426) is a better option than the first replacement driver (e.g., 424). At operation 610, the power consumption of the second driver is compared with the baseline power consumption and the method continues as described in accordance with the operations of method 500.

Based on the calculated ROI, a replacement driver is selected for consideration at operation 510. For example, a first and a second replacement driver option is determined. By comparing the ROIs for the first and second replacement drivers, a selection can be made between the first and second replacement driver for a determination to be made at operation 510. If the first replacement driver has a better ROI than the second replacement driver, the first replacement driver is selected for further analysis at operation 510.

Figure 7:
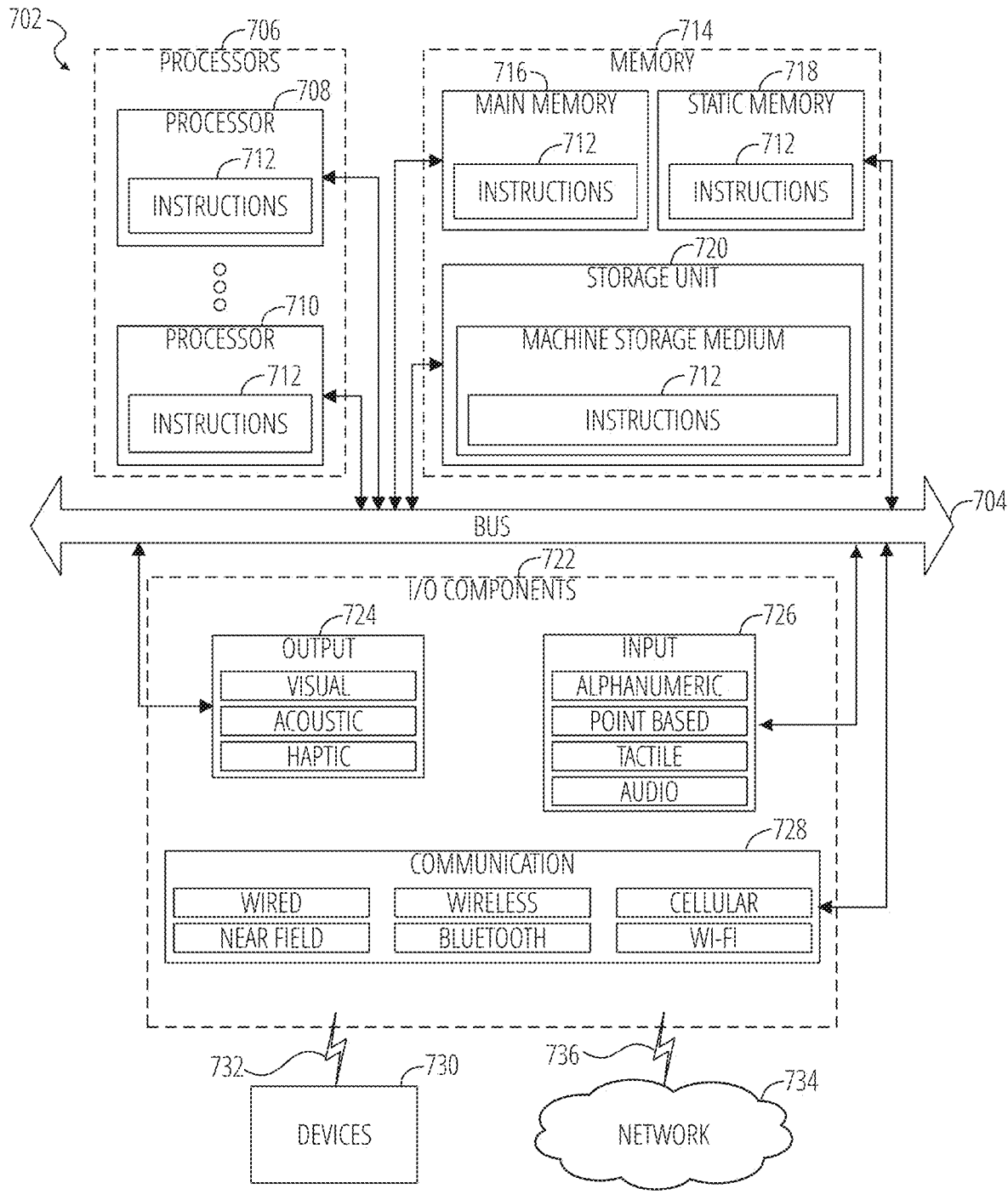
FIG. 7 is a diagrammatic representation of a machine in the example form of a computer system within which a set of instructions for causing the machine to perform any one or more of the methodologies discussed herein may be stored and executed.

FIG. 7 illustrates a diagrammatic representation of a machine 702 in the form of a computer system within which a set of instructions may be executed for causing the machine 702 to perform any one or more of the methodologies discussed herein, according to an example embodiment. Specifically, FIG. 7 shows a diagrammatic representation of the machine 702 in the example form of a computer system, within which instructions 712 (e.g., software, a program, an application, an applet, an app, or other executable code) for causing the machine 702 to perform any one or more of the methodologies discussed herein may be executed. For example, the instructions 712 may cause the machine 702 to execute an EDA software system that executes any one or more of the operations of method 500. Additionally, or alternatively, the instructions 712 may implement FIGS. 1 and 2A-2D. The instructions 712 transform the general, non-programmed machine 702 into a particular machine 702 programmed to carry out the described and illustrated functions in the manner described here. In alternative embodiments, the machine 702 operates as a standalone device or may be coupled (e.g., networked) to other machines. In a networked deployment, the machine 702 may operate in the capacity of a server machine or a client machine in a server-client network environment, or as a peer machine in a peer-to-peer (or distributed) network environment. The machine 702 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 712, sequentially or otherwise, that specify actions to be taken by the machine 600. Further, while only a single machine 702 is illustrated, the term "machine" shall also be taken to include a collection of machines 702 that individually or jointly execute the instructions 712 to perform any one or more of the methodologies discussed herein.

The machine 702 may include processors 706, memory 714, and I/O components 722, which may be configured to communicate with each other such as via a bus 704. In an example embodiment, the processors 706 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 706 and a processor 706 that may execute the instructions 712. The term "processor" is intended to include multi-core processors 708 that may comprise two or more independent processors (sometimes referred to as "cores") that may execute instructions 712 contemporaneously. Although FIG. 7 shows multiple processors 706, the machine 702 may include a single processor with a single core, a single processor with multiple cores (e.g., a multi-core processor), multiple processors with a single core, multiple processors with multiple cores, or any combination thereof.

The memory 714 may include a main memory 716, a static memory 718, and a storage unit 720, each accessible to the processors 710 such as via the bus 704. The main memory 716, the static memory 718, and the storage unit 720 store the instructions 712 embodying any one or more of the methodologies or functions described herein. The instructions 712 may also reside, completely or partially, within the main memory 716, within the static memory 718, within the storage unit 720, within at least one of the processors 706 (e.g., within the processor's cache memory), or any suitable combination thereof, during execution thereof by the machine 702.

The I/O components 722 may include a wide variety of components to receive input, provide output, produce output, transmit information, exchange information, capture measurements, and so on. The specific I/O components 722 that are included in a particular machine will depend on the type of machine. For example, portable machines such as mobile phones will likely include a touch input device or other such input mechanisms, while a headless server machine will likely not include such a touch input device. It will be appreciated that the I/O components 720 may include many other components that are not shown in FIG. 7. The I/O components 720 are grouped according to functionality merely for simplifying the following discussion, and the grouping is in no way limiting. In various example embodiments, the I/O components 720 may include output components 724 and input components 726. The output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 722 may include communication components 728 operable to couple the machine 702 to a network 734 or devices 730 via a coupling 736 and a coupling 732, respectively. For example, the communication components 728 may include a network interface component or another suitable device to interface with the network 734. In further examples, the communication components 728 may include wired communication components, wireless communication components, cellular communication components, and other communication components (NFC, Bluetooth, and Wi-Fi) to provide communication via other modalities. The devices 730 may be another machine or any of a wide variety of peripheral devices (e.g., a peripheral device coupled via a universal serial bus (USB)).

Executable Instructions and Machine-Storage Medium

The various memories (e.g., 714, 716, 718, and/or memory of the processor(s) 706) and/or the storage unit 720 may store one or more sets of instructions and data structures (e.g., software) embodying or utilized by any one or more of the methodologies or functions described herein. These instructions (e.g., the instructions 712), when executed by the processor(s) 706, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 734 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 734 or a portion of the network 734 may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 712 may be transmitted or received over the network 734 using a transmission medium via a network interface device (e.g., a network interface component included in the communication components 728) and utilizing any one of a number of well-known transfer protocols (e.g., hypertext transfer protocol (HTTP)). Similarly, the instructions 616 may be transmitted or received using a transmission medium via the coupling 732 (e.g., a peer-to-peer coupling) to the devices 730. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 702, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer storage medium storing instructions, which, when executed by the machine, cause the machine to perform operations comprising:
      accessing an integrated circuit design stored in memory, the integrated circuit design comprising an initial clock tree comprising routes that interconnect a plurality of clock-tree instances;
      selecting, from the plurality of clock-tree instances of the initial clock tree, a first driver to evaluate for resizing, the first driver being a first size and having a first leakage current;
      determining a baseline power consumption measurement for the first driver based on the first size and the first leakage current of the first driver;
      identifying a plurality of replacement drivers to replace the first driver;
      determining a power consumption measurement for a second driver in the plurality of replacement drivers;
      based on determining that the power consumption measurement for the second driver is less than the baseline power consumption measurement, replacing the first driver with the second driver, the second driver being a second size;
   and
   generating a layout instance for the integrated circuit design of an updated clock tree based on the second driver, the layout instance describing physical layout dimensions of the integrated circuit design.

2. The system of claim 1, wherein the operations further comprise:
   determining a set of power consumption measurements corresponding to the plurality of replacement drivers; and
   determining that the second driver has a lowest power consumption measurement in the set of power consumption measurements.

3. The system of claim 1, wherein the determining of the power consumption measurement for the second driver is based on a pin capacitance value, an upstream activity value, an internal power consumption, and a leakage power dissipation of the second driver.

4. The system of claim 3, wherein the determining the power consumption measurement for the second driver comprises:
   combining the upstream activity value with a change in pin capacitance value of the first driver and the second driver.

5. The system of claim 4, wherein the determining the power consumption measurement for the second driver comprises:
   based on combining the upstream activity value with the change in pin capacitance value:
   combining a sum of pin capacitance values for any of a buffer or inverter corresponding to the second driver with the combined upstream activity value and change in pin capacitance value.

6. The system of claim 1, wherein the determining the baseline power consumption measurement for the first driver comprises:
   combining the first size and first leakage current to obtain the baseline power consumption measurement.

7. The system of claim 1, wherein the selecting of the first driver is based on user input.

8. The system of claim 1, wherein the selecting of the first driver is based on a position of the clock-tree instance in the clock tree.

9. The system of claim 1, wherein:
   the clock-tree instance is a first clock-tree instance; and
   the operations further comprise resizing a second clock-tree instance by replacing a third driver in the second clock-tree instance with a fourth driver selected from the plurality of clock tree instances in response to determining that the resizing of the second clock-tree instance results in a reduction of power consumption of the second clock tree instance.

10. A method comprising:
accessing an integrated circuit design stored in memory, the integrated circuit design comprising a clock tree comprising routes that interconnect a plurality of clock-tree instances;
determining, by at least one hardware processor, a baseline power consumption measurement corresponding to a sub-tree of a clock-tree instance from among the plurality of interconnected clock-tree instances, the baseline power consumption measurement corresponding to a size of a first clock-tree instance;
selecting a first driver of the sub-tree to evaluate for resizing, the first driver being a first size and having a first leakage current;
identifying a plurality of replacement drivers to replace a first driver;
determining a power consumption measurement for each driver of the plurality of replacement drivers;
based on determining that the power consumption measurement for at least one of the plurality of replacement drivers is less than the baseline power consumption measurement:
selecting a second driver from the plurality of replacement drivers to replace the first driver, the second driver being a second size; and
replacing the first driver with the second driver of the plurality of replacement drivers;
inserting a buffer corresponding to the second driver; and
generating a layout instance for the integrated circuit design including the second driver, the layout instance describing physical layout dimensions of the integrated circuit design.

11. The method of claim 10, further comprising:
determining a set of power consumption measurements corresponding to a sub-tree of the clock-tree instance, each power consumption measurement corresponding to one of a plurality of replacement drivers; and
determining that the second driver has a lowest power consumption measurement in the set of power consumption measurements.

12. The method of claim 10, wherein the determining of the power consumption measurement for the second driver is based on a pin capacitance value, an upstream activity value, an internal power consumption, and a leakage power dissipation of the second driver.

13. The method of claim 12, wherein the determining the power consumption measurement for the second driver comprises:
combining the upstream activity value with a change in pin capacitance value of the first driver and the second driver.

14. The method of claim 13, wherein the determining the power consumption measurement for the second driver comprises:
based on combining the upstream activity value with the change in pin capacitance value:
combining a sum of pin capacitance values for any of a buffer or inverter corresponding to the second driver with the combined upstream activity value and change in pin capacitance value.

15. The method of claim 10, wherein the determining the baseline power consumption measurement for the first driver comprises:
combining the first size and first leakage current to obtain the baseline power consumption measurement.

16. The method of claim 10, wherein the identifying of the clock-tree instance is based on user input.

17. The method of claim 10, wherein the identifying of the clock-tree instance is based on a position of the clock-tree instance in the clock tree.

18. The method of claim 10, wherein:
the clock-tree instance is a first clock tree instance; and
the method further comprises resizing a second clock-tree instance in response to determining that the resizing of the second clock-tree instance results in a reduction of power consumption in a sub-tree of the second clock-tree instance.

19. A computer storage medium storing instructions, which when executed by a machine, cause the machine to perform operations comprising:
accessing an integrated circuit design stored in memory, the integrated circuit design comprising a clock tree comprising routes that interconnect a plurality of clock-tree instances;
selecting, from the plurality of clock-tree instances of the clock tree, a first driver to evaluate for resizing, the first driver being a first size and having a first leakage current;
determining a baseline power consumption measurement of a first instance of the clock tree, the first instance including the first driver and the baseline power consumption measurement corresponding to an area and the first leakage current based on the first driver;
identifying a plurality of replacement drivers to replace the first driver;
determining a power consumption measurement for each driver of the plurality of replacement drivers;
based on determining that the power consumption measurement for at least one of the plurality of replacement drivers is less than the baseline power consumption measurement:
selecting a second driver from the plurality of replacement drivers to replace the first driver, the second driver being a second size; and
replacing the first driver with the second driver of the plurality of replacement drivers;
verifying the second driver reduces at least one of (1) size of the clock tree, (2) power consumption of the clock tree, or (3) improves timing of the clock tree as compared to the first driver; and
generating a layout instance for the integrated circuit design including the second driver, the layout instance describing physical layout dimensions of the integrated circuit design.

20. The computer storage medium of claim 19, wherein the determining of the power consumption measurement for the second driver is based on a pin capacitance value, an upstream activity value, an internal power consumption, and a leakage power dissipation of the second driver.

* * * * *